June 25, 1935.  W. SCHAAKE  2,005,907
TROLLEY WIRE SUPPORT
Filed Oct. 14, 1933  2 Sheets-Sheet 1
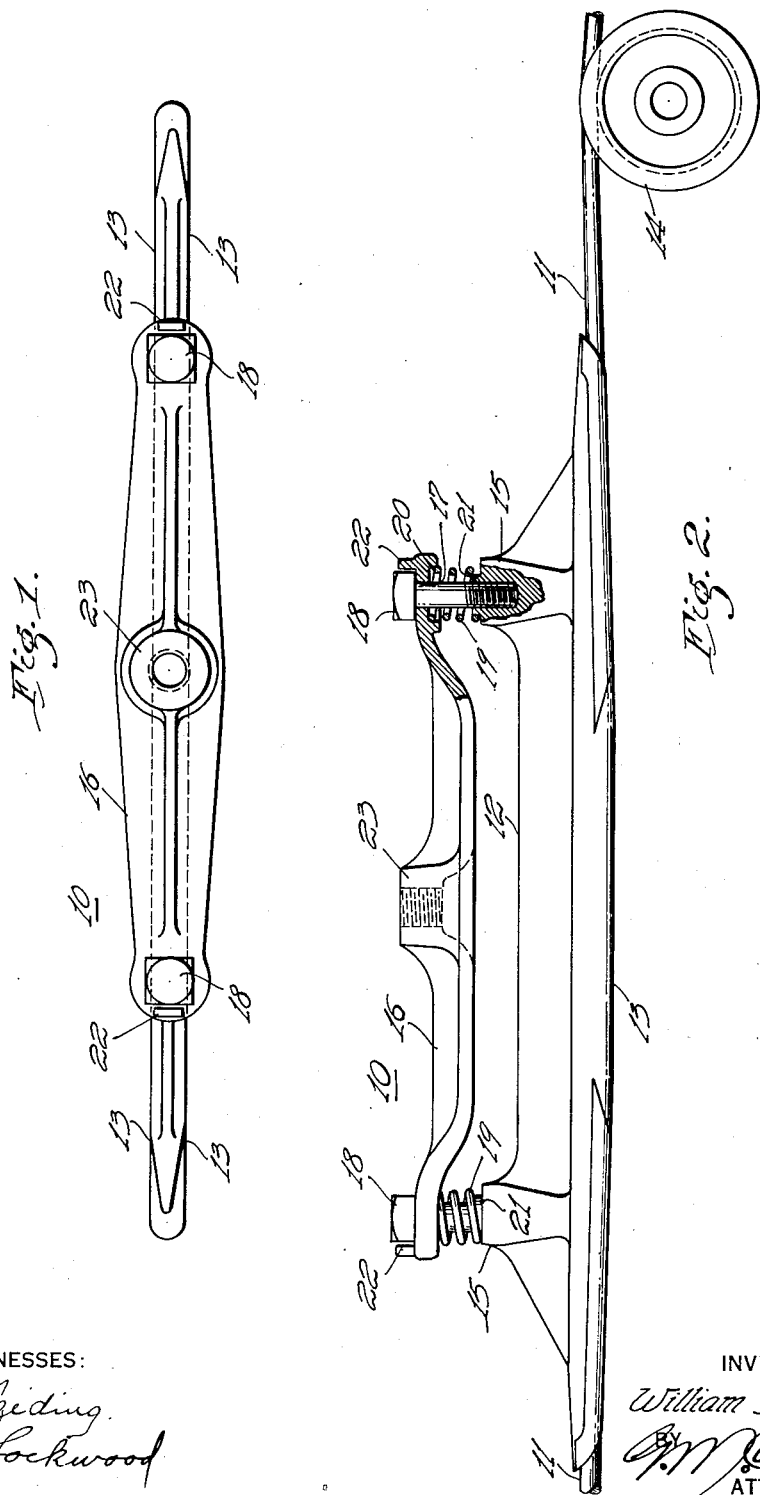
WITNESSES:
E. C. Reiding
R R Lockwood
INVENTOR
William Schaake.
BY
P. M. Crawford
ATTORNEY

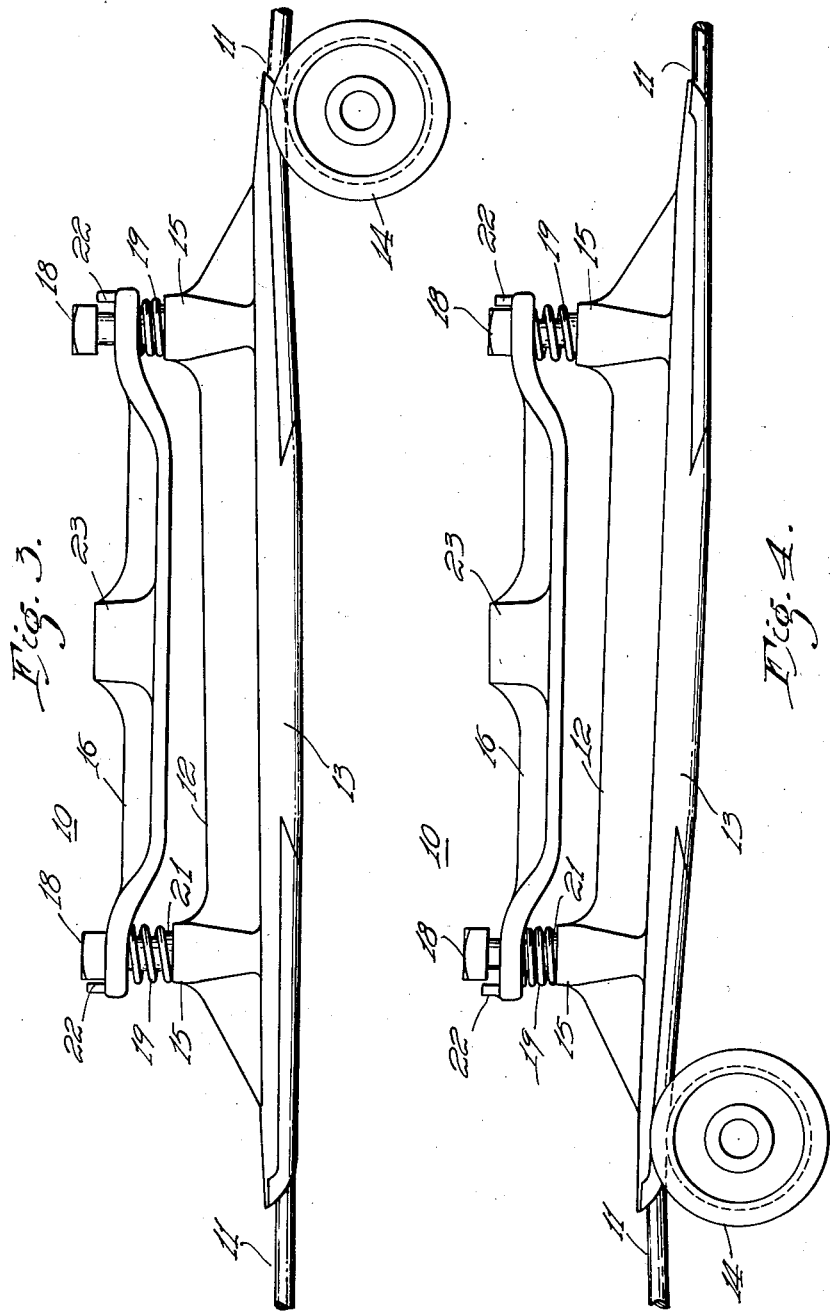

Patented June 25, 1935

2,005,907

UNITED STATES PATENT OFFICE 2,005,907

TROLLEY WIRE SUPPORT

William Schaake, Pittsburgh, Pa., assignor to Westinghouse Electric & Manufacturing Company, East Pittsburgh, Pa., a corporation of Pennsylvania Application October 14, 1933, Serial No. 693,559

8 Claims. (Cl. 191—40)

My invention relates, generally, to overhead trolley wire systems and it has particular relation to the construction of supports for trolley wires.

If a trolley wire is rigidly supported at various points, as is the customary manner, there is always present the likelihood of crystallization of the conductor at the ends of the trolley ears which are used for supporting the conductor. This crystallization is caused by the movement of the trolley wire as the current collector passes along it. When the supporting ear is rigidly mounted, there is no flexibility in it with respect to the trolley wire and as a result relatively high flexural stresses are applied in the conductor near the ends of the rigidly supported trolley ear.

It will be readily understood that such crystallization resulting from the repeated application of the intensified flexural stresses ultimately causes the trolley wire to break near the ends of the trolley ears, although the trolley wire itself may be only slightly worn. Considerable difficulty and expense has been encountered due to the crystallization of the trolley wires, and one of the purposes of this invention is to overcome this difficulty.

Another undesirable feature which is present when trolley wires or conductors are rigidly mounted is the noise which is made as the current collector, in traversing the trolley wire, encounters the rigidly mounted trolley ears. This noise in the form of a thump is transmitted down the trolley pole to the roof of the vehicle, thereby causing considerable annoyance to passengers.

In order to avoid the crystallization of the trolley wire at the ends of rigidly mounted trolley ears, and further, to reduce the noise resulting from their use when a current collector comes in contact with the trolley ears, it is proposed to provide a relatively gradual or easy transition to and from the trolley ears. This transition may be provided by mounting the trolley ear with respect to a support in such manner that it is slightly rotatable about an axis which is above and at right angles to the direction in which the trolley wire extends.

However, when such a transition is provided, it is desirable to so mount the trolley ear that it may be adjusted for different conditions in the overhead. That is, different stresses will be applied to the trolley wire by the current collector as it travels therealong depending upon whether the particular portion of the overhead is located on a straight, curved or graded part of the path or right of way which the vehicle follows. In order to reduce installation and maintenance costs, it is desirable to provide a flexible trolley ear which will be suitable for all of these different conditions and yet one which will be composed of substantially identical parts.

In view of the foregoing, therefore, the object of my invention, generally stated, is to provide a flexible trolley ear for carrying a trolley wire which shall be simple and efficient in operation and which may be readily and economically manufactured, installed, repaired and replaced.

The principal object of my invention is to provide for flexibly mounting a trolley wire.

Another important object of my invention is to provide for flexibly mounting a trolley ear which is arranged to grip a trolley wire.

Another object of my invention is to provide for adjusting the degree of flexibility in a flexible trolley ear.

Other objects of my invention will in part be obvious and in part appear hereinafter.

My invention, accordingly, is disclosed in the embodiment hereof shown in the accompanying drawings and comprises the feature of construction, combination of elements and arrangement of parts which will be exemplified in the construction hereinafter set forth and the scope of the application of which will be indicated in the appended claims.

For a complete understanding of the nature and scope of my invention, reference may be had to the following detailed description taken in connection with the accompanying drawings, in which Figure 1 is a view, in top plan, of a flexible trolley ear embodying my invention;

Fig. 2 is a view in side elevation of the trolley ear illustrated in Fig. 1, certain parts being broken away to more clearly illustrate the invention; and Figs. 3 and 4 are views in side elevation of the flexible trolley ear, showing different phases in its operation as a current collector passes underneath it.

Referring now particularly to Figs. 1 and 2 of the drawings, the reference character 10 designates generally a flexible conductor support which is arranged to support a trolley wire 11. As illustrated, the support 10 comprises an ear or main body member 12 having depending lips 13 for gripping the trolley wire 11 in the customary manner. The ends of the lips 13 are bevelled or ground down in order to provide a smooth transition for a current collector, such as a trolley wheel 14, which is carried by a suitable vehicle (not shown) from the trolley wire 11 on to the ear 12 and from the ear 12 back to the trolley wire 11.

As shown, each end of the ear 12 is provided with a threaded boss 15. In order to mount the trolley ear 12 in operative position, a support member 16 is provided which may be rigid or relatively inflexible. The support member 16 may be in the form of a rolled section such as a channel or T section or in the form of a casting, as shown. Each end of the support member 16 is provided with an opening 17 within which a bolt 18 may be loosely positioned. The bolts 18, as illustrated, are screwed into the threaded bosses 15, thereby providing for supporting the trolley ear 12 from the support member 16 while yet permitting limited relative movement toward and away from each other.

With a view to normally maintaining the trolley ear 12 in alignment with the trolley wire 11 and to provide the desired degree of resiliency and flexibility, a helical spring 19 is provided between the under surface of the support member 16, in a suitable recess 20, and the upper surface of the boss 15 around a suitable raised portion 21.

A lug 22 may be integrally formed with the support member 16 at either end thereof in order to prevent the bolts 18 from turning after they have once been properly adjusted.

The support member 16 may be provided, at the central portion thereof, with a threaded boss 23 for mounting on a suitable hanger (not shown). The hanger which is used for carrying the support member 16 is preferably rigidly mounted so that the support member 16 will also be held substantially rigid.

While the support member 16 has been illustrated in this embodiment of the invention as being in the form of a rolled section or casting, so that it is relatively inflexible, it is within the scope of this invention to provide the support member 16 of relatively flexible material in the event that the springs 19 do not provide the required degree of flexibility. Such a construction may be desirable in order to extend the limits of operation and usefulness of a trolley wire support constructed in accordance with my invention.

It will also be apparent that other resilient means such as rubber or the like may be substituted for the springs 19 without departing from the scope of my invention.

While I have shown bolts 18 as being used for loosely mounting the support member 16 above the trolley ear 12, it will be readily apparent that other retaining means may be used such as a pin either secured to the ear 12 by a rivet or other means or integrally formed therewith to reduce the cost of manufacture.

When the trolley wire support 10 is installed, the compressive force applied by the springs 19 is adjusted by means of the bolts 18 in accordance with the conditions under which the device will be operated. That is, if along certain portions of the right of way a greater pressure will be applied to the conductor support 10 by the current collector 14 than along others such as underneath a bridge or like condition, it is desirable to provide a greater initial compression in the springs 19, in order to compensate for this added force. On the other hand, if the pressure applied by the current collector 14 is relatively slight, it may be desirable to decrease the compression initially applied to the springs 19.

Referring now particularly to Figs. 2, 3 and 4 of the drawings, it will be observed that the current collector 14 is illustrated in three different positions. In Fig. 2, the current collector 14 is approaching the trolley wire support 10 and, as illustrated, the trolley wire 11 is slightly raised due to the contact pressure which is applied upwardly by the current collector 14, as will be readily understood. As set forth hereinbefore, if the ear 12 is rigidly mounted, there will be a concentration of flexural stress in the trolley wire 11 near the ends of the lips 13. However, with a conductor support constructed in accordance with my invention, such stress concentration is entirely eliminated.

As the current collector 14 continues to move from right to left, it comes into engagement, first with the right-hand end of the trolley ear 12 and, due to the fact that the trolley ear 12 is flexibly supported with respect to the support member 16, the trolley ear 12 will move upward for a distance depending upon the characteristics of the spring 19, thereby imparting a slight rotative movement to the trolley ear 12 when otherwise it would have been held rigid as the current collector continues in its movement.

The current collector 14 continuing to move in the direction set forth gradually releases the compressive stress applied to the right-hand spring 19 and increases the compressive stress applied to the left-hand spring 19 until the position illustrated in Fig. 4 is reached at which substantially no stress is applied to the right-hand spring 19 while most of it is applied to the left-hand spring.

It will be observed that, through the use of my invention, a gradual transition is provided from and to the trolley wire 11 as the current collector 14 passes underneath the trolley wire support 10. Not only are the objectionable noises entirely eliminated due to this gradual transition but also the concentration of flexural stresses near the ends of the trolley ear 12 are also eliminated. The effect of a trolley support of the type illustrated and described hereinbefore is to make the conditions met by the current collector 14 substantially uniform regardless of whether it is traversing the unsupported part of the trolley wire 11 or is traversing the part of the trolley wire which is directly supported by the support 10.

Since further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. A support for a trolley wire comprising, in combination, an ear for gripping the trolley wire, a support member movably mounted on said ear, and a plurality of resilient members interposed between said ear and said support member to maintain the ear in alinement with the trolley wire and to permit relative movement therebetween when a current collector traverses the ear and portions of the trolley wire adjacent thereto.

2. A support for a trolley wire comprising, in combination, an ear for gripping the trolley wire, a support member extending along and movably mounted above said ear, and a resilient member disposed near each end of said support member and between the under surface thereof and the upper surface of said ear to maintain the ear in alinement with the trolley wire and to permit relative movement therebetween when a current collector traverses the ear and portions of the trolley wire adjacent thereto.

3. A support for a trolley wire comprising, in combination, an ear for gripping the trolley wire, a support member extending along and above said ear, retaining means connecting said ear to said support member and adapted to permit limited relative movement therebetween, and resilient means interposed between said ear and said support member for biasing them apart.

4. A support for a trolley wire comprising, in combination, an ear for gripping the trolley wire, a support member extending along and above said ear, resilient means interposed between said ear and said support member for biasing them apart, and adjustable retaining means disposed between said ear and said support member for limiting and adjusting the biasing effects of said resilient means in order to permit predetermined relative movement between the ear and the support member when a current collector traverses the ear and portions of the trolley wire adjacent thereto.

5. A support for a trolley wire comprising, in combination, an ear for gripping the trolley wire provided with threaded openings near the ends thereof, a substantially rigid support member disposed above said ear and having openings in alinement with said threaded openings in said ear, a bolt positioned in each of said openings in the support member and in engagement with the corresponding threaded openings in said ear, and a compression spring surrounding each bolt between the under surface of the support member and the upper surface of said ear for biasing them apart thereby maintaining the ear in alinement with the trolley wire and permitting relative movement between the ear and the support member when a current collector traverses the ear and portions of the trolley wire adjacent thereto.

6. Flexible support means for a trolley wire comprising, in combination, a main body member adapted to grip the trolley wire, a relatively inflexible elongated support member positioned above the main body member, means loosely connecting the main body member to the support member and permitting limited relative movement toward and away from each other, and resilient means interposed between the main body member and the support member for biasing them away from each other.

7. Flexible support means for a trolley wire comprising, in combination, a main body member adapted to grip the trolley wire, a relatively inflexible elongated support member adapted to be supported from the mid-portion thereof and positioned above the main body member, retaining means loosely disposed near the ends of the support member and secured to the main body member for maintaining them inseparable and permitting relative movement therebetween when a current collector traverses the main body member and portions of the trolley wire adjacent thereto, and resilient means disposed between the main body member and the support member near the ends thereof for biasing them apart.

8. A trolley wire support comprising, in combination, an ear having a pair of depending lips for gripping the trolley wire, a threaded boss disposed on the upper side and near each end of said ear, a substantially rigid support member adapted to be mounted on a hanger and provided with openings near the ends thereof in alinement with said threaded bosses, bolts extending through said openings into said threaded bosses for limiting the relative movement between the ear and the support member, lugs integrally formed with said support member and juxtaposed with the heads of said bolts to prevent the rotation thereof, and a helical spring surrounding each bolt and interposed between the upper surfaces of said bosses and the corresponding under surfaces of said support member to permit relative movement between the ear and the support member when a current collector traverses the ear and portions of the trolly wire adjacent thereto.

WILLIAM SCHAAKE.